(12) United States Patent
Hadfield et al.

(10) Patent No.: US 8,549,551 B2
(45) Date of Patent: Oct. 1, 2013

(54) SYSTEM AND METHOD FOR CLEANING TELEVISION VIEWING MEASUREMENT DATA

(75) Inventors: Kim Hadfield, Vancouver, WA (US);
Amir Yazdani, Portland, OR (US);
Aaron Harsh, Portland, OR (US);
Marla Loper, Portland, OR (US);
Michael Vinson, Piedmont, CA (US)

(73) Assignee: Rentrak Corporation, Portland, OR (US)

( * ) Notice: Subject to any disclaimer, the term of this patent is extended or adjusted under 35 U.S.C. 154(b) by 0 days.

(21) Appl. No.: 13/543,757

(22) Filed: Jul. 6, 2012

(65) Prior Publication Data

US 2013/0014147 A1    Jan. 10, 2013

Related U.S. Application Data

(60) Provisional application No. 61/504,980, filed on Jul. 6, 2011, provisional application No. 61/612,813, filed on Mar. 19, 2012.

(51) Int. Cl.
*H04N 9/00* (2006.01)
*H04N 7/16* (2011.01)
*H04N 7/173* (2011.01)
*G06F 15/173* (2006.01)

(52) U.S. Cl.
USPC ............... 725/14; 725/19; 725/94; 725/114; 725/115; 725/116; 725/138; 725/144; 725/145; 725/146; 709/223; 709/224

(58) Field of Classification Search
USPC ............... 725/14, 19, 94, 114, 115, 116, 138, 725/144, 145, 146; 709/223, 224
See application file for complete search history.

(56) References Cited

U.S. PATENT DOCUMENTS

| | | | |
|---|---|---|---|
| 2003/0216971 A1* | 11/2003 | Sick et al. ................... | 705/26 |
| 2006/0122877 A1 | 6/2006 | Yazdani et al. | |
| 2007/0198327 A1 | 8/2007 | Yazdani et al. | |
| 2010/0103820 A1* | 4/2010 | Fuller et al. ................... | 370/236 |
| 2010/0332305 A1* | 12/2010 | Higgins et al. ............ | 705/14.16 |
| 2012/0260280 A1 | 10/2012 | Harsh et al. | |
| 2012/0278828 A1 | 11/2012 | Yazdani et al. | |

OTHER PUBLICATIONS

Wikipedia.org, "Multiple system operator," <http://en.wikipedia.org/w/index.php?title=Multiple_system_operator&oldid=485092009>, internet accessed on Apr. 2, 2012, 2 pages.

* cited by examiner

*Primary Examiner* — Hoang-Vu A Nguyen-Ba
(74) *Attorney, Agent, or Firm* — Perkins Coie LLP

(57) ABSTRACT

A system and method for cleaning television viewing behavior data collected from set top boxes by detecting and correcting various problems that can occur in the viewing data. Three problems that may be detected and corrected by the system include: overflows of memory buffers; inclusion of non-human generated tuning events; and presence of clock offsets. After cleaning the television viewing behavior data, the cleaned data may be used to analyze audience viewing behavior in a manner that achieves a higher degree of accuracy than can be achieved by using uncleaned television viewing behavior data.

16 Claims, 6 Drawing Sheets

SYSTEM AND METHOD FOR CLEANING TELEVISION VIEWING MEASUREMENT DATA

CROSS-REFERENCE TO RELATED APPLICATION(S)

This application claims the benefit of U.S. Provisional Patent Application No. 61/504,980, entitled "System and Method for Cleaning Television Viewing Measurement Data" and filed Jul. 6, 2011, and U.S. Provisional Patent Application No. 61/612,813, entitled "Empirical Ad-pod Detection", and filed Mar. 19, 2012, each of which is incorporated herein by reference in its entirety.

BACKGROUND

In contrast to people meters, which are specifically designed with television viewing behavior data collection and analysis in mind, the main design goal of television set top boxes ("STBs") is to decode video content necessary for display on a television, and to provide a user interface to that content. In some cases, modern STBs also include features to enhance the television viewing experience. For example, some STBs may, in addition to supporting tuning to enable a television viewer to watch live broadcast content, support electronic programming guides, picture-in-picture functionality, digital video recording ("DVR") functions, closed captioning, video on demand, and the like.

Although some models of STB may be capable of tracking a viewer's television viewing behavior and reporting it for viewing behavior analysis, this capability is typically implemented as an afterthought. Accordingly, various problems exist for utilizing collected STB data for the analysis of television viewing behavior, such as problems relating to the precision and the reliability of the data.

The problems of collecting viewing behavior data is exacerbated by television service providers that support a diverse array of various STB models produced by various manufacturers. Because of a lack of standardization across the industry, each STB model may present unique challenges such as different reporting formats or capabilities. Moreover, variations may even be present within different STBs having the same model designation, when STBs are allowed to operate on outdated firmware versions.

The need exists for a system that overcomes the above problems, as well as one that provides additional benefits for the collection of usable viewing data. Overall, the examples herein of some prior or related systems and their associated limitations are intended to be illustrative and not exclusive. Other limitations of existing or prior systems will become apparent to those of skill in the art upon reading the following Detailed Description.

DETAILED DESCRIPTION

A system and method for cleaning television viewing behavior data collected from set top boxes by detecting and correcting various problems that can occur in the viewing data is disclosed herein. Three problems that may be detected and corrected by the system include: (1) overflows of memory buffers; (2) inclusion of non-human generated tuning events; and (3) presence of clock offsets. After cleaning the television viewing behavior data, the cleaned data may be used to analyze audience viewing behavior in a manner that achieves a higher degree of accuracy than can be achieved by using uncleaned television viewing behavior data.

In some embodiments of the disclosed technology, the system may store the cleaned television viewing behavior data in a non-transitory computer readable storage medium. The computer readable storage medium may then be distributed to a third-party, who may use it for analyzing television viewing behavior with a high degree of accuracy and reliability. In some embodiments, all or part of the system is implemented by computer-executable instructions that are stored in a non-transitory computer readable storage medium and executed by one or more processors.

Various embodiments of the invention will now be described with reference to the figures. The following description provides specific details for a thorough understanding and enabling description of these embodiments. One skilled in the art will understand, however, that the invention may be practiced without many of these details. Additionally, some well-known structures or functions may not be shown or described in detail, so as to avoid unnecessarily obscuring the relevant description of the various embodiments.

The terminology used in the description presented herein is intended to be interpreted in its broadest reasonable manner, even though it is being used in conjunction with a detailed description of certain specific embodiments of the invention. Certain terms may even be emphasized herein; however, any terminology intended to be interpreted in any restricted manner will be overtly and specifically defined as such in this Detailed Description section.

The System

Figure 1:
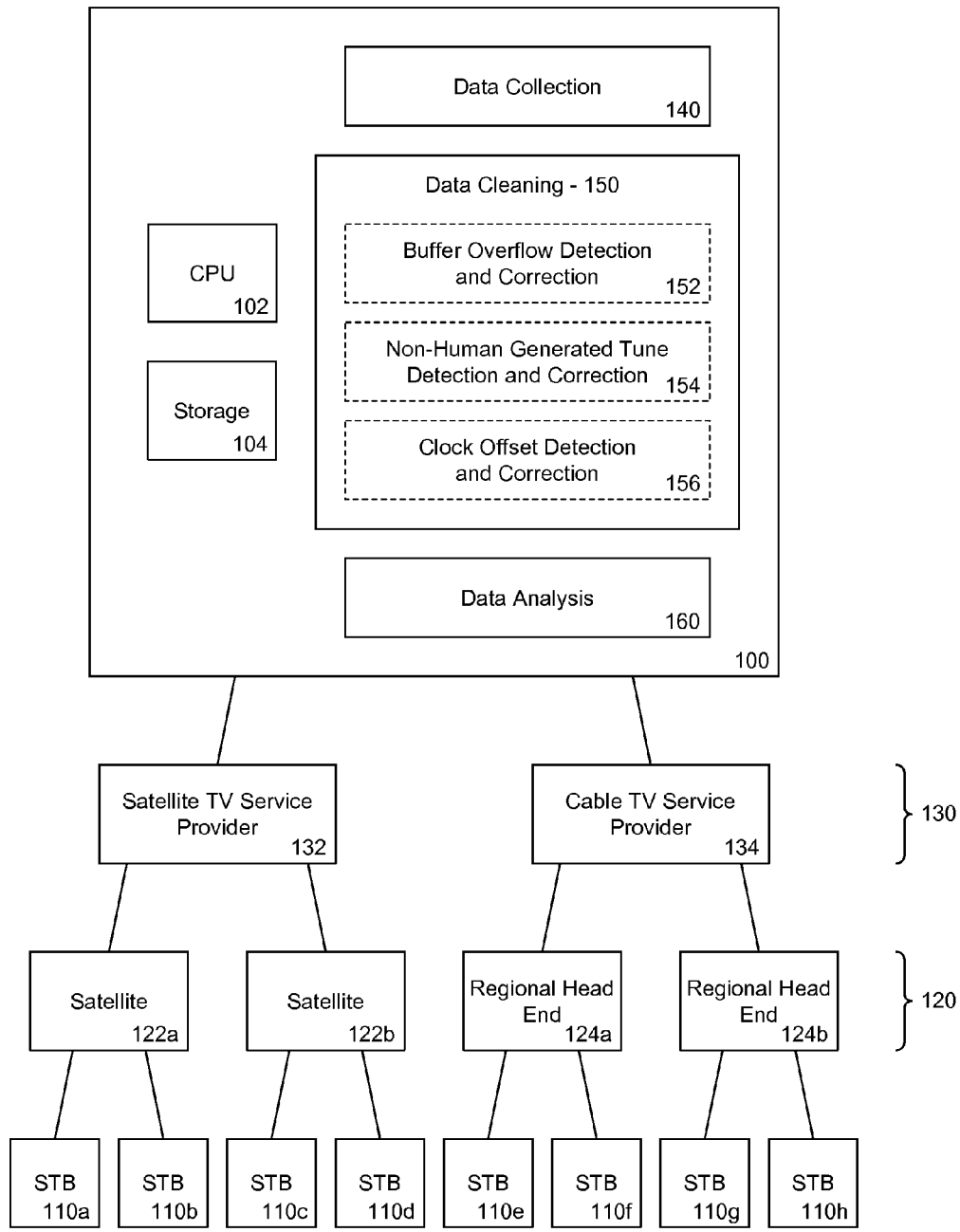
FIG. 1 is a block diagram illustrating a system for cleaning television viewing data.

FIG. 1 is a block diagram illustrating a system 100 for collecting, cleaning, and analyzing television viewing data. The system includes a central processing unit (CPU) 102 that executes instructions implementing at least some modules of the system, and a storage device 104 that stores the instructions. The modules include a data collection module 140, a data cleaning module 150, and a data analysis module 160. The modules 140, 150, and 160 may be implemented in software (such as functions, objects, subroutines, and applications) and/or hardware (such as custom ASICs). Some embodiments of the system may utilize multiple processors and/or storage devices. For the sake of simplicity, FIG. 1 illustrates only a single CPU 102 and a single storage device 104.

The data collection module 140 collects television viewing behavior data that represents the viewing behavior of many television viewers (also known as a viewing audience). The viewing behavior data is typically buffered in memory within television set top boxes (STBs) 110a-110h, which decode video signals for television sets. In some embodiments, a STB 110 will be physically housed in a television set, while in others a STB 110 will be physically separated from the television set. A STB 110 that is physically separated will typically send decoded audio and video signals to a television set in the form of one or more cables such as a coaxial cable carrying an analog signal, a High Definition Multimedia Interface cable carrying a digital signal, and so on.

The STBs 110a-110h typically receive video signals from television network distribution nodes 120 that are maintained by television service providers 130. In the case of a satellite television service provider 132, the STBs 110a-110d receive video signals from the satellite television service provider's satellites 122. The satellite television service provider 132 may also be known as a direct broadcast satellite (DBS) service provider. Examples of DBS service providers include DirecTV and Dish Network. In the case of a cable television service provider 134, the STBs 110e-110h receive video signals from the cable television service provider's regional head ends 124. A cable television service provider 134 with multiple regional head ends 124a and 124b is also known as a multiple system operator (MSO), examples of which include Comcast Corporation, Time Warner Cable, Cox Communication, and so on.

Although not illustrated in FIG. 1 for the sake of brevity, a television signal may be distributed through a hierarchy of nodes on its way to reaching an STB 110. For example, a cable television signal may pass from a regional head-end 124 through a fiber optic trunk line, a series of distribution amplifiers, pole-mounted fiber-optic nodes, and a coaxial line in its way to reaching one of the STBs 110e-110h.

Although a STB 110 will typically be located on a customer's premises, the STB may or may not be customer-owned. In many cases, a STB 110 will be owned by a television service provider 130 and leased to the customer. However, in some cases, a customer may purchase, own, and use a STB that the television service provider supports. New STB models are frequently introduced by STB manufacturers with additional features demanded by the marketplace (such as Digital Video Recording capability, additional tuners, etc.). Since replacement is relatively expensive, it is not unusual for television service providers 130 to support a wide variety of different manufacturers, models, and versions of STBs 110 across their networks.

Some additional details regarding the system 100, including the manner in which it may collect, use, and analyze television viewing data can be found in U.S. patent application Ser. No. 11/701,959, filed on Feb. 1, 2007, entitled "Systems and Methods for Measuring, Targeting, Verifying, and Reporting Advertising Impressions"; U.S. patent application Ser. No. 13/081,437, filed on Apr. 6, 2011, entitled "Method and System for Detecting Non-Powered Video Playback Devices"; and U.S. patent application Ser. No. 13/096,964, filed on Apr. 28, 2011, entitled "Method and System for Program Presentation Analysis"; each of which is herein incorporated by reference in its entirety.

Memory Buffer Overflows

A problem with television viewing behavior data that is received from STBs is the occurrence of memory buffer overflows at the STBs. Most STBs 110 have an internal memory buffer that is used to store viewing data. The stored viewing data is periodically transmitted from the STB to the network operator or other collector of the behavior data. Buffer overflow occurs when the contents of the buffer overflow before the STB is able to transmit the stored data (e.g., to one of the nodes 120). An overflow condition usually causes data to be deleted from the buffer and irrevocably lost. Accordingly, data that is collected from a STB 110 having buffer overflow will be incomplete, either by having missing data or data corrupted in some fashion. The buffer overflow problem may be caused by, for example, an inadequately sized buffer, an algorithm utilized by software or firmware of the STB 110 that needlessly or redundantly stores excessive amounts of data in the buffer, too infrequent of a buffer flushing schedule, or any combination of the above.

Figure 2:
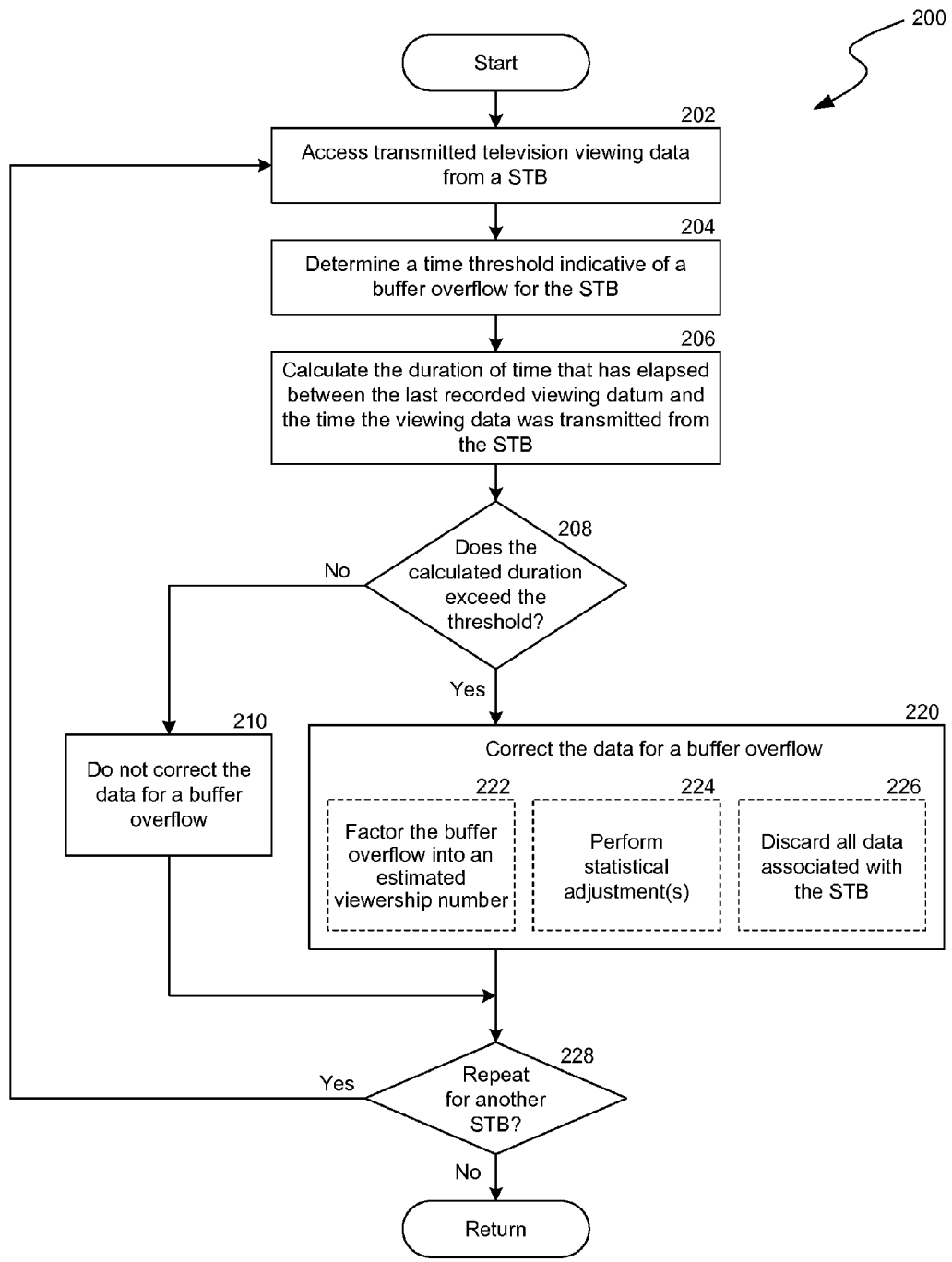
FIG. 2 is a flow diagram illustrating a process for cleaning television viewing data by performing set top box memory buffer overflow detection and correction.

The system 100 includes a buffer overflow detection and correction module 152 that is configured to detect and correct received viewing data. FIG. 2 is a flow diagram illustrating a process 200 for cleaning television viewing data that is performed by the buffer overflow detection and correction module 152 of the system 100. At a block 202, the system accesses television viewing data received from a STB, such as the STB 110a, which will be used as an example for further illustration. The STB data to analyze may be specifically selected by a user of the system 100, or may be arbitrarily selected, such as being the first STB within a list of STBs 110a-110d serviced by a television service provider, or may be automatically selected as part of a schedule or other algorithm.

At a block 204, the system selects a time threshold associated with the STB 110a that is likely to be indicative of a buffer overflow for that particular STB. The time threshold is compared to a measure of time reflecting the delay from the recording of the last datum in the buffer to when the buffer was received from the STB in order to estimate whether a buffer overflow condition occurred. (In many STBs, when a buffer has been filled, the STB ceases to record new data in the buffer. As a result, determining the elapsed time between the last entry in the buffer and when the buffer contents are transmitted to the system may be used to assess the likelihood that other tuning events were detected at the STB but could not be stored in the buffer because the buffer was full.) In some embodiments, the time threshold may be predetermined by the system 100 or alternately input by a user of the system. In other embodiments, a tuning event history or statistic for the STB 110a is utilized to select the time threshold. For example, if the tuning event history of the STB indicates that the user averages 4.8 hours between tuning events for the STB, it means that the viewer associated with the STB typically makes five tuning events per day. The calculated average time between tuning events may be stored by the system in the storage device 104. The system 100 may then multiply the average time duration by a predetermined factor (e.g., by a factor of between approximately 1.5 to 40) to determine a time threshold that is indicative of buffer overflow. The time elapsed between the last two transmissions of television viewing data from the STB 110a may also influence the time threshold, so that the threshold is longer when the timing elapsed between transmissions is longer. For example, selecting a time threshold that is longer than the time elapsed between the last two buffer transmissions would not be effective, since the system would always determine that the calculated duration did not exceed the threshold. The time threshold may be determined on an individual STB-basis, or may apply across groups of STBs. Because of the variability between STBs and the particular usage pattern of each STB, typically the time threshold is determined on an individual STB basis.

It will be appreciated that use of the time threshold as previously described is effective in those circumstances where a STB buffer will not store additional tuning events once filled. In some STBs, the buffer may operate on a first-in first-out (FIFO) basis so that when the buffer reaches capacity, new tuning events that are added to the buffer causes the first tuning events that are stored in the buffer to be deleted. In this circumstance, a buffer overflow condition may be detected by looking at the first tuning event in received television viewing data and assessing how much time had elapsed between the previous receipt of television tuning data by the system and the first tuning event in the buffer. If the period between the last receipt of television tuning data and the first tuning event in the buffer exceeds a time threshold selected by the system, a buffer overflow condition may also be presumed.

At a block 206, the system 100 calculates the duration of time that has elapsed between the last transmission of viewing data from the STB and the last recorded viewing datum contained in the received viewing data. An example of the last recorded viewing datum for the STB 110a is the last tuning event that was contained in the received viewing data. For example, if the viewing data contains a last tuning event occurring at 9:00 pm on July 6th, and if the tune data is collected from the STB 110a most recently at 10:00 pm on July 15th, then the calculated time duration would be 217.0 hours, or 9 days and 1.00 hour.

Proceeding to a decision block 208, the system 100 compares the time threshold indicative of a buffer overflow (as determined in block 204) with the duration of time elapsed between last recorded data and data transmission (as calculated in block 206). If the duration of time calculated exceeds the time threshold, processing proceeds to a block 210. In block 210, the data for the STB 110a is not corrected for a buffer overflow. The process 200 then continues to a block 228.

Referring to decision block 208, if the calculated duration of time exceeds the time threshold, then processing continues at block 220 where the viewing data for the STB 110a is corrected for the buffer overflow. The system 100 may perform the correction in different ways, such as by performing one or more of the processes reflected in different options 222, 224, and 226. In a first option 222, the system 100 utilizes the received data even though the accuracy of the data is likely affected by the buffer overflow condition. That is, the system still factors the viewing data into estimated viewership numbers. In a second option 224, the system 100 performs one or more statistical adjustments to the viewing data. For example, if the household associated with a STB 110a has a history of tuning into a broadcast of the program "Friends" on Tuesday nights at 9 PM, and if a buffer overflow also occurred such that data for Tuesday is not present in the received STB data, a statistical adjustment can be made for the number of viewers of the program by assuming that the household associated with the STB 110a tuned into "Friends" when calculating the viewership statistic. Even though the data received from the STB 110a didn't contain that tuning event, it likely occurred based on past historical experience and is therefore accounted for by the system. This statistical adjustment may be performed by the data analysis module 160 after the process 200 is completed. In a third option 226, the system 100 discards all of the recently-received data associated with the STB 110a that might be tainted as a result of the buffer overflow condition. That is, rather than rely on the data or attempt to estimate actual viewing patterns based on historical viewing patterns, the system 100 opts to discard any data that is perceived to be inaccurate because of the butter overflow condition. After the completion of any correction of data in block 220, processing continues at a block 228.

At block 228, a determination is made whether to repeat the processing in blocks 202-228 for another STB. For example, if the STB 110b has not yet been processed for a potential buffer overflow condition, the process will be repeated for the STB 110b. The process 200 may be repeated for each of the other STBs 110c-110h. When there are no more STBs 110 left to process, the process 200 halts. The process 200 may be performed anew each time the data collection module 140 collects new television viewing data.

An some embodiments, the analysis is performed over a group of STBs rather than only one STB at a time. A user-selected or algorithmically-selected subset of STBs are analyzed together, for example by looking at each STB's number of reported tune events within a specified period of time. In general, when such a distribution is computed over a sufficiently large set of STBs, it is relatively smooth. When a buffer overflow condition occurs, the distribution may, rather than being smooth, have a sharp or relatively sharp cutoff at a certain number of tuning events. This certain number of tuning events corresponds to the maximum number of tuning events that the STBs are able to store before their internal memory buffer overflows (it may not be a perfectly sharp cutoff, because different tuning events may take somewhat different amounts of memory). The presence of a sharp cutoff can be detected, either visually by a human user or algorithmically by a computing device programmed to detect such cutoffs. The presence of a buffer found in this way may then be used either to flag all STBs with a number of tuning events close to the cutoff, or to estimate the time threshold described above.

Non-Human Generated Tuning Events

The system 100 may also include a non-human generated detection and correction module 154 that is configured to detect and correct received viewing data to account for non-human tuning events. A problem in television viewing behavior data is that a STB 110 will often track non-human generated tuning events in addition to tracking human-generated tune events. Human-generated tuning events, such as a viewer changing a channel or powering on or off the viewer's television and/or STB, are important data for the accurate analysis of that user's television viewing behavior. Non-human generated tuning events that are performed by the STB, however, can cause an inaccurate analysis of television viewing behavior data collected and analyzed from a STB. For example, a STB that automatically wakes up at 3:00 AM and tunes to a frequency for automatically checking the accuracy of its internal date/time clock or performing other diagnostics does not constitute actual television viewing behavior. Another example of a non-human generated tune is an operator-initiated STB reset that causes a STB to change to a predefined channel (such as channel 1) at a particular time and/or day. Such examples of non-human tuning events will result in the inaccurate measurement of actual human viewing behavior if the system is unable to detect and remove the non-human tuning events.

Figure 3A:
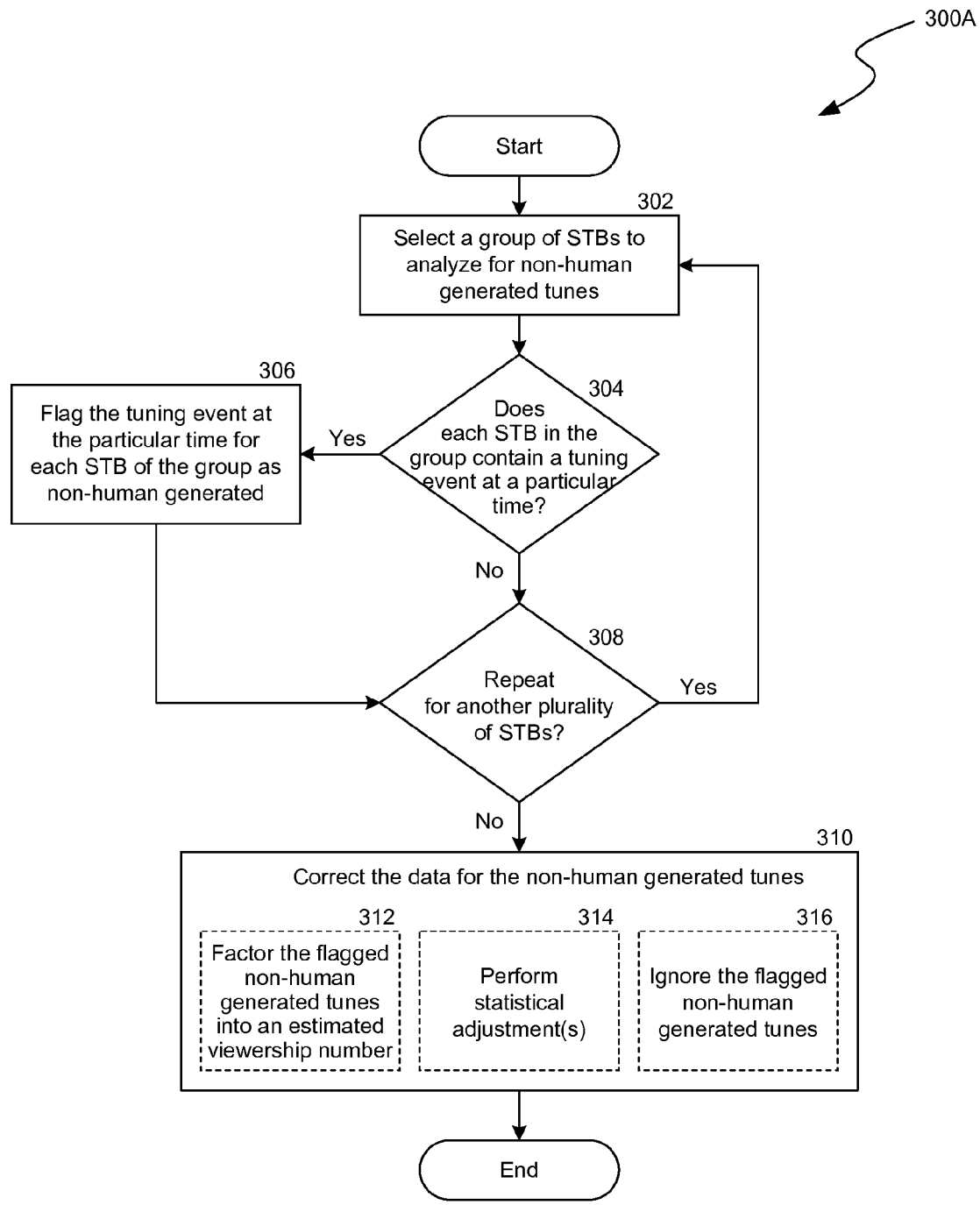
FIGS. 3A-B are flow diagrams illustrating processes for cleaning television viewing data by detecting and correcting for non-human generated tunes.
Figure 3B:
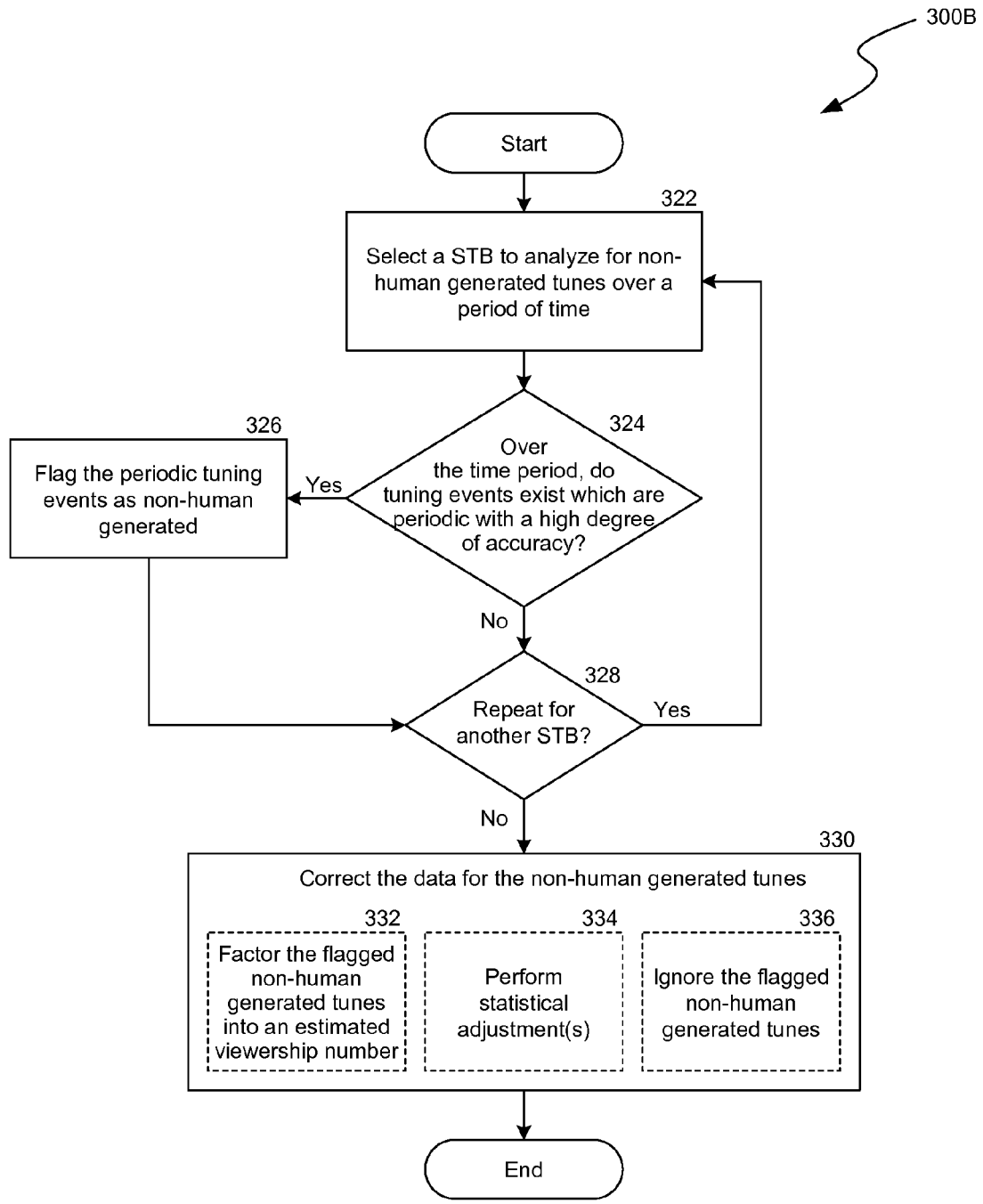

FIGS. 3A-B are flow diagrams illustrating two different processes 300A and 300B for cleaning television viewing data by detecting and correcting for non-human generated tuning events. Processes 300A and 300B may be performed by the system 100 individually or in combination. The process 300A analyzes groups of STBs for non-human generated tuning events, while the process 300B analyzes individual STBs for non-human generated tuning events.

As is shown in FIG. 3A, the process 300A begins at a block 302, where the system 100 selects a group of STBs to analyze for non-human generated tuning events. The selected group of STBs could be determined by, for example, which television service provider 130 is servicing the STBs, which regional head-end 124 is servicing the STBs, which satellite 122 is servicing the STBs, which other television distribution network node is involved in servicing the STBs, the make, model, firmware version, and/or the feature set of the STBs, the network that the STBs viewed over a particular time period, or any other factor. A person having ordinary skill in the art will understand that non-human generated tuning events, such as those being caused by maintenance being performed on STBs, may originate from a variety of sources and be targeted at a variety of STB destinations, which the aforementioned criteria could be designed to target.

After selection of a group of STBs to analyze, processing continues a decision block 304. At decision block 304, the system 100 determines whether each STB in the selected group contains the same tuning event at a particular time. For example, a tuning event may be identified that indicates that an operator initiated a STB reset across the selected group of STBs. When analyzing whether each tuning event occurred at the same time, some small range of time differences may be allowed to account for network communication delays, unsynchronized clocks, or other timing issues which cause the tuning events to occur in close proximity but not necessarily at exactly the same time. If the same tuning event is detected in the group of STBs, processing proceeds to a block 306. At block 306, for each STB of the group, the tuning event at the particular time is flagged as "non-human generated," and processing proceeds to a decision block 308. If, however, the same tuning event is not detected in the group of STBs, no events in the viewing data are flagged. Processing then continues to the decision block 308.

At the decision block 308, a determination is made by the system whether to repeat the detection process for another group of STBs. In one embodiment, the system maintains a list of criteria that it uses to select subsequent groups of STBs. In this case, when any unused list items remain, processing will return to the block 302 whether another group of STBs will be selected. When no unused list items remain, the processing proceeds to block 310.

At block 310, the system 100 corrects the flagged data as needed for non-human generated tuning events. In various embodiments, the correction may be performed differently, as is illustrated by the processes reflected in options 312, 314, and 316. For example, in a first option 312, the system factors the flagged non-human generated tuning events into an estimated viewership number. That is, the system 100 uses the non-human generated tuning events as actual tuning events, on the basis that the existence of the non-human tuning events across the group will be evenly distributed. In a second option 314, the system performs one or more statistical adjustments to the viewing data. For example, the system might compare each STB's behavior during the period of the non-human generated tuning event to the same STB's behavior at a corresponding time (such as the same day of the week and time of day, or the same television program being viewed) and adjust the viewing data to reflect the behavior during the corresponding time. In a third option 316, the system ignores or otherwise removes the flagged non-human generated tuning events from consideration. After processing the viewing data to take into account the non-human tuning events, processing is complete.

In some embodiments, the system may correct the non-human tuning events as they are detected. Doing so may eliminate the need to store flagged tuning events, thereby increasing processing efficiency and/or speed.

As is shown in FIG. 3B, the process 300B begins at a block 322, where the system selects a STB to analyze for non-human generated tuning events over a certain time period. For example, the system 100 may select the STB 110a for analysis. The selection may be arbitrary (e.g., selecting the first STB on a list of available STBs), or the selection may be specific (e.g., applying a specific criteria such as STBs that are a particular model, manufacturer, and so on). In some aspects, only STBs that have DVR functionality are selected. The period of time should be long enough to include repetitive patterns in the viewing data (such as the start of a repeating television show each day or each week, and so on). For example, the selected period of time could be approximately one month.

After selection of a STB to analyze, processing continues to a decision block 324. At the decision block 324, the system 100 determines whether, over the period of time being analyzed, tuning events exist that are periodic with a high degree of accuracy. A high degree of accuracy means that the tuning event was likely triggered automatically by a non-human, such as by an internal clock inside an STB. For example, an STB that has DVR functionality may be programmed to automatically tune to a specific channel at a particular time each day or week in order to record periodically recurring content on that channel. Such a STB may automatically tune into the channel with an accuracy of, for example, 6.0 seconds or less. In some aspects, a range of channels will be analyzed for periodic tuning events having a high degree of accuracy.

When such highly accurate periodic tuning events are detected, processing proceeds to block 326, where those tuning events are flagged by the system as "non-human generated." Processing then proceeds to a decision block 328. At the decision block 328, a determination is made whether to repeat the process of detecting non-human generated events for another STB.

Referring back to the decision block 324, when highly accurate periodic tuning events are not encountered, processing proceeds to the decision block 328. At the block 328, if the process 300B determines to not repeat for another STB, then it proceeds to the block 330.

At block 330, the system 100 corrects the flagged data as needed for non-human generated tuning events. In various embodiments, the correction may be performed differently, as is illustrated by the processes reflected in options 332, 334, and 336. For example, in a first option 332, the system factors the flagged non-human generated tuning events into an estimated viewership number. That is, the system 100 uses the non-human generated tuning events as actual tuning events, on the basis that the existence of the non-human tuning events across the group will essentially be evenly distributed. In a second option 334, the system performs one or more statistical adjustments to the viewing data. For example, the system might compare each STB's behavior during the period of the non-human generated tuning event to the same STB's behavior at a corresponding time (such as the same day of the week and time of day, or the same television program being viewed) and adjust the viewing to reflect the behavior during the corresponding time. In a third option 336, the system ignores or otherwise removes the flagged non-human generated tuning events from consideration. After processing the viewing data to take into account the non-human tune events, processing is complete.

Clock Offsets

The system 100 may also include a clock offset detection and correction module 156 that is configured to detect and correct offsets that occur when one group of STBs record viewing data with unexpectedly shifted (or offset) time stamps. Offsets can occur if, for example, a local event delays a national broadcast to an unexpected time, such as 3 hours later than anticipated within a particular locality. Such a delay may occur at a particular regional head end, such as the regional head end 124a. Another example of an offset is when an unexpected clock setting event occurs, such as an erroneously performed daylight savings time adjustment occurring within some region or group of STBs, causing the internally recorded time to be off by 1 hour. Another example may be clock drift, where the clock reference within a STB may differ significantly from the actual time.

Figure 4:
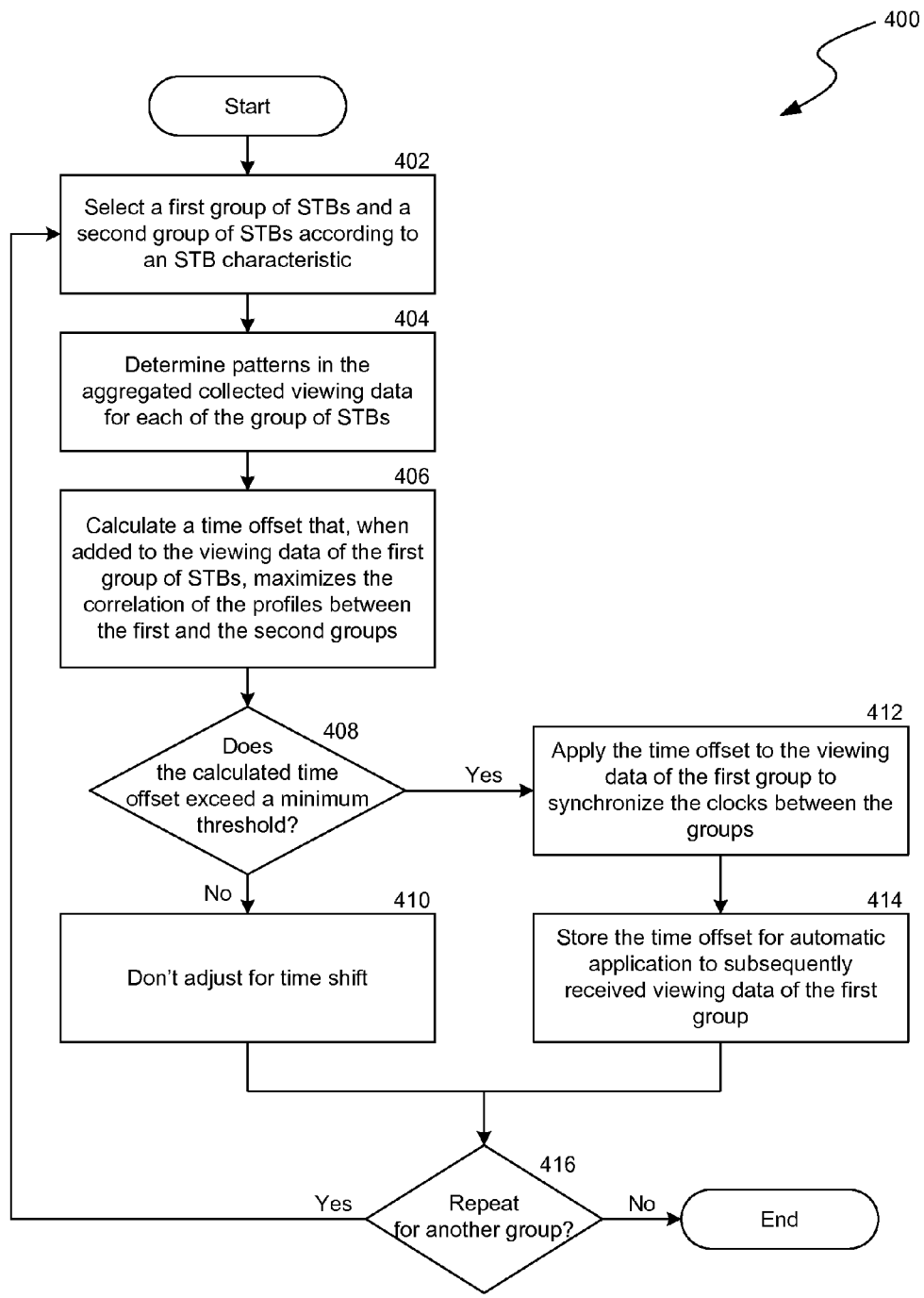
FIG. 4 is a flow diagram illustrating a process for cleaning television viewing data by performing clock offset detection and correction.

FIG. 4 is a flow diagram illustrating a process 400 for cleaning television viewing data by performing clock offset detection and correction, which may be performed by the system 100. At a block 402, the system 100 selects a first group of STBs and a second group of STBs according to a STB characteristic. Examples of the STB characteristic include the associated television service provider, regional head end, satellite, the make and/or the model of the STB, the network being viewed, and so on. Generally, the first group of STBs and the second group of STBs will be selected so that there are no STBs in common between the groups. For example, the STBs 110e and 110f that are associated with the regional head end 124a may be selected as the first group, and all other STBs 110g and STB 110h associated with the cable TV service provider 134 may be selected as the second group. After the groups are selected in the block 402, processing proceeds to a block 404, where the system aggregates the viewing data for each of the groups of STBs in order to generate a viewing profile associated with each group.

Figure 5:
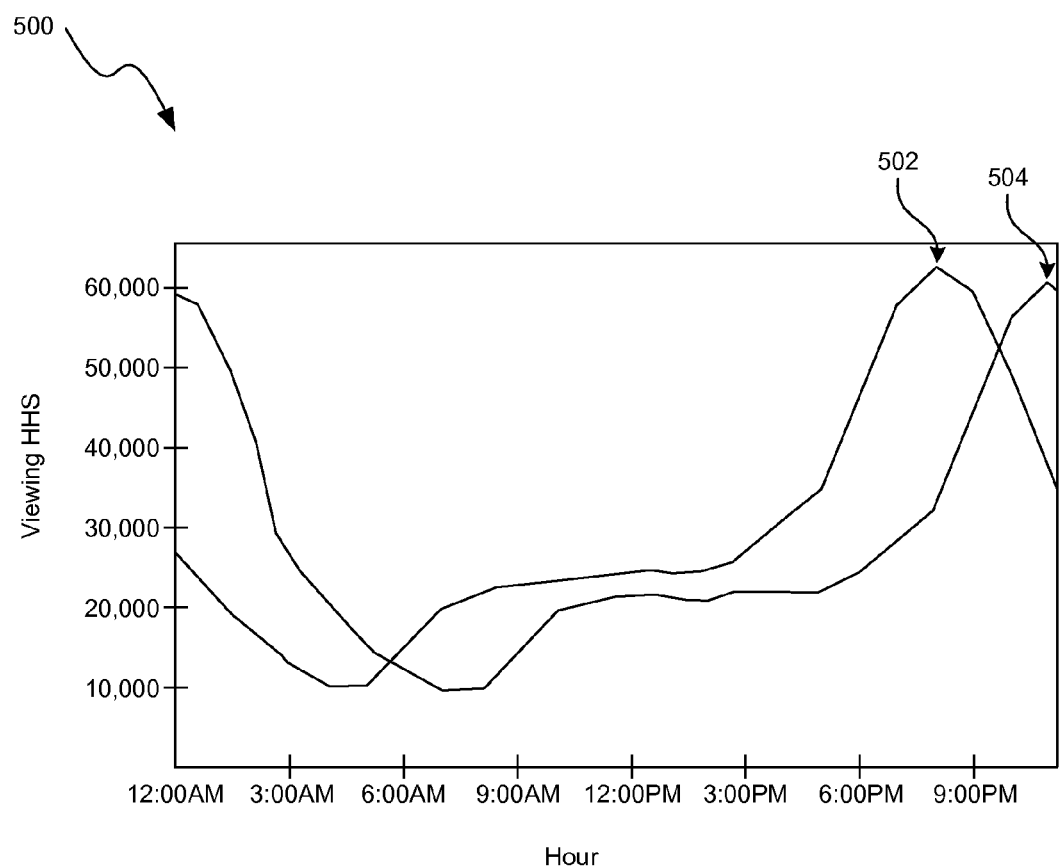
FIG. 5 is a representative graph of viewing profiles corresponding to aggregated viewing data for two groups of set top boxes, as determined and further utilized in the process flow of FIG. 4.

FIG. 5 is a representative graph 500 that contains a first line 502 depicting the aggregated viewing data for the first group of set top boxes (the "first viewing profile") and a second line 504 depicting the aggregated viewing data for the second of set top boxes (the "second viewing profile"). In the depicted graph, there are tens of thousands of viewing households with STBs in each of the selected groups, as can be seen on the vertical axis. The horizontal axis indicates the number of viewing households at various different times of a day (also known as "dayparts"). As can be readily seen in the graph, the lines 502 and 504 are not horizontally aligned, but are rather misaligned (or "offset") by approximately 3 hours.

Returning to FIG. 4, at a block 406 the system calculates an offset that maximizes the correlation between the first viewing profile and the second viewing profile. That is, the system calculates an offset that minimizes the misalignment in time between the viewing behavior of the two groups of STBs. Taking as example the viewing profiles in FIG. 5, when the line 502 representing the first group is delayed by 3.0 hours, its correlation with the other line 504 is maximized. Therefore, the time offset calculated by the system in block 406 for this example is 3.0 hours.

In some embodiments, the system 100 calculates the offset at the block 406 by recognizing when similar groups of advertisements occurred in each of the first viewing profile and the second viewing profile, and then measuring the time offset between the groups of advertisements. The recognition of a contiguous group of advertisements, known as an "ad pod," may be performed by, for example, determining the presence of a sharp drop in the number of viewers of a group around a particular time. Methods for detecting an ad pod are further detailed in U.S. Provisional Patent Application No. 61/612, 813, entitled "Empirical Ad-pod Detection," filed on Mar. 19, 2012. The system 100 looks for a similar sequence of ad pods occurring in one viewing group as it finds in another viewing group, and then measures the time offset between the similar sequences. For example, if the system 100 finds a sequence of: (i) a first ad pod lasting 4.0 minutes, (ii) non-advertised content lasting 15.0 minutes, and (iii) a second ad pod lasting 3.5 minutes in each of the first viewing group and the second viewing group, the two sequences can be utilized as references to calculate the time offset. In some embodiments, the system 100 may look at only the onset of an ad pod or only at the termination of an ad pod to calculate the time offset.

After the time offset is calculated in block 406, processing continues to a decision block 408. At decision block 408, the calculated time offset is compared to a minimum threshold. The threshold is selected so that a de minimis shift is not applied by the system to align two groups of STB data having only minimal differences. An example minimum threshold, which is effective for some scenarios, is 15.0 seconds. In other embodiments, the minimum threshold may be significantly longer or shorter than 15 seconds. In some embodiments, a user of the system 100 may specify the minimum threshold. If the calculated time offset does not exceed the threshold at decision block 408, processing proceeds to a block 410 where the first group of STBs will not be adjusted for a time shift. If, however, the calculated time offset exceeds the threshold at decision block 408, processing proceeds to a block 412.

At block 412, the system 100 applies the calculated time offset (e.g., 3.0 hours) to the viewing data of the first group of STBs in order to correct for the determined clock offset. By applying the clock offset, the clocks within the first group of STBs will be synchronized with respect to the clocks in the second group of STBs. Processing then continues to a block 414, where the calculated time offset is stored for automatic application to subsequently-received viewing data of the first group of STBs. For example, the offset may be stored in the storage device 104. The system 100 may automatically apply the stored offset to any additional television viewing data collected from the first group of STBs by the television viewing data collection module 140. After block 414, the processing continues to the decision block 416.

At the decision block 416, the system 100 decides whether to repeat previously performed steps (beginning with block 402) for another group of STBs. A repeat may also include selecting another second group of STBs. For example, the system may repeat process 400 for each regional head end 124, for each satellite 122, for each television service provider 130, etc. When repetition is not necessary, processing terminates.

It will be appreciated that the system 100 may perform various combinations and orders of the processes 200, 300A, 300B, and 400. For example, in one embodiment, only one of the processes 200, 300A, 300B, and 400, will be performed. As another example, after the collection of television viewing data by the data collection module 140, the data cleaning module 150 first performs the process 200, followed by the process 300A, then the process 300B, and finally the process 400. In other embodiments, the system 100 simultaneously performs various combinations of the aforementioned processes. For example, the system 100 could perform all of the problem detection steps prior to performing all of the problem correction steps.

After the data cleaning module 150 has cleaned the collected television viewing data, the cleaned data can be used by the data analysis module 160 to perform television viewing audience analysis in a manner that is more accurate and reliable than would otherwise occur if the data analysis module 160 were to instead analyze uncleaned television viewing data. For example, when the data analysis module 160 reports television viewership numbers of a particular audience, television viewership numbers are more accurately reported since only human viewing audience members are being counted after non-human generated tuning events are excluded. As another example, the accuracy of viewing audience measurements are further enhanced by excluding or accounting for incomplete data of set top boxes that experienced buffer overflows. As yet another example, audience analysis of a particular program with a scheduled broadcast on a particular network on a particular time, for which viewership is measured by the data analysis module 160, is more accurate when any part of the viewing audience being analyzed is corrected for a clock offset. Indeed, one having ordinary skill in the art will appreciate a variety of different scenarios in which television viewing data analysis can benefit from the data cleaning techniques disclosed herein.

In some aspects, the cleaned television viewing data will be stored on a computer-readable media (such as a Digital Versatile Disk or flash drive), and/or transmitted to a third-party (such as via transmission via the internet or other public or private network) for subsequent and/or remote analysis of the data. For example, a third-party may access an on-line Web portal of the system 100 to access specific desired cleaned television viewing data. The third-party may then, after the requested cleaning operations have been performed, download the cleaned television viewing data from the Web portal for remote analysis on the third-party's computer.

Those skilled in the art will appreciate that the system 100 and methods disclosed herein may be implemented on any computing system or device. Suitable computing systems or devices include personal computers, server computers, minicomputers, mainframe computers, distributed computing environments that include any of the foregoing, and the like. Such computing systems or devices may include one or more processors that execute software to perform the functions described herein. Processors include programmable general-purpose or special-purpose microprocessors, programmable controllers, application specific integrated circuits (ASICs), programmable logic devices (PLDs), or the like, or a combination of such devices. Software may be stored in memory, such as random access memory (RAM), read-only memory (ROM), flash memory, or the like, or a combination of such components. Software may also be stored in one or more storage devices, such as magnetic or optical based disks, flash memory devices, or any other type of non-volatile storage medium for storing data. Software may include one or more program modules which include routines, programs, objects, components, data structures, and so on that perform particular tasks or implement particular abstract data types. The invention can also be practiced in distributed computing environments, where tasks or modules are performed by remote processing devices, which are linked through a communications network, such as a Local Area Network ("LAN"), Wide Area Network ("WAN") or the Internet. In a distributed computing environment, program modules or sub-routines may be located in both local and remote memory storage devices.

In general, the detailed description of embodiments of the invention is not intended to be exhaustive or to limit the invention to the precise form disclosed above. While specific embodiments of, and examples for, the invention are described above for illustrative purposes, various equivalent modifications are possible within the scope of the invention, as those skilled in the relevant art will recognize. For example, while processes or blocks are presented in a given order, alternative embodiments may perform routines having steps, or employ systems having blocks, in a different order, and some processes or blocks may be deleted, moved, added, subdivided, combined, and/or modified. Each of these processes or blocks may be implemented in a variety of different ways. Also, while processes or blocks are at times shown as being performed in series, these processes or blocks may instead be performed in parallel, or may be performed at different times. Accordingly, the invention is not limited except as by the appended claims.

We claim:

1. A computer-implemented method for cleaning television viewing data by detecting and correcting a set top box buffer overflow, the method comprising:

accessing television viewing data transmitted from a set top box;

determining a time threshold indicative of a buffer overflow for the set top box;

calculating a duration that has elapsed between the last television viewing datum logged by the set top box in the accessed television viewing data and the time when the television viewing data was transmitted from the set top box;

if the calculated duration exceeds the determined time threshold, then correcting the television viewing data for a set top box buffer overflow; and if the calculated duration does not exceed the determined time threshold, then not correcting the television viewing data for a set top box buffer overflow.

2. The method of claim 1, wherein determining the time threshold indicative of a buffer overflow for the set top box comprises:

analyzing an average frequency of tuning events for the set top box over a period of time, and when the average frequency is relatively high, setting the determined time threshold to be relatively short, and when the average frequency is relatively low, setting the determined time threshold to be relatively long.

3. The method of claim 1, wherein correcting the television viewing data for the set top box buffer overflow includes performing a statistical adjustment to the television viewing data.

4. The method of claim 1, wherein correcting the television viewing data for the set top box buffer overflow includes discarding all of the accessed television viewing data transmitted by the set top box.

5. A computer-implemented method for cleaning television viewing data by detecting and correcting periodic non-human generated tuning events, the method comprising:

accessing television viewing data transmitted from a set top box, the television viewing data comprised of a plurality of tuning events;

determining whether non-human generated tuning events are present in the accessed television viewing data by identifying tunings events that are periodic with a high degree of accuracy to a channel over a selected time period; and if highly-accurate periodic tuning events are determined to be present, then treating the highly-accurate periodic tuning events as non-human generated tuning events and correcting for the non-human generated tuning events.

6. The method of claim 5, wherein correcting for the non-human generated tuning events comprises deleting the flagged non-human generated tuning events.

7. The method of claim 5, wherein correcting for the non-human generated tuning events comprises ignoring the flagged non-human generated tuning events during a subsequent analysis of the television viewing data.

8. A computer-implemented method for cleaning television viewing data by detecting and correcting non-human generated tuning events in groups of set top boxes, the method comprising:

selecting a plurality of set top boxes;

accessing television viewing data transmitted from the plurality of set top boxes, the television viewing data comprised of a plurality of tuning events;

determining whether each set top box within the plurality of set top boxes contains a tuning event at the same time;

if each set top box within the plurality of set top boxes are determined to contain a tuning event at the same time, then flagging those tuning events as non-human generated; and correcting any flagged non-human generated tuning events.

9. The method of claim 8, wherein the plurality of set top boxes is selected according to at least an operator that is servicing the set top boxes; and wherein the tuning events at the same time are caused by an operator-initiated reset.

10. The method of claim 8, wherein correcting the flagged non-human generated tuning events comprises ignoring the flagged non-human generated tuning events during a subsequent analysis of the television viewing data.

11. The method of claim 8, wherein correcting the flagged non-human generated tunes comprises deleting the flagged non-human generated tuning events.

12. A computer-implemented method for cleaning television viewing data by detecting and correcting clock offsets, the method comprising:

selecting a first plurality of set top boxes and a second plurality of set top boxes according to a set top box characteristic for each of the pluralities;

accessing television viewing data associated with the first and the second pluralities of set top boxes;

determining a first viewing profile corresponding to the viewing data associated with the first plurality of set top boxes;

determining a second viewing profile corresponding to in the viewing data associated with the second plurality of set top boxes;

calculating a time offset that when added to the first viewing profile maximizes correlation with the second viewing profile;

if the calculated time offset exceeds a threshold, correcting for a clock offset between the first and second pluralities of set top boxes; and if the calculated time offset does not exceed the threshold, not correcting for a clock offset between the first and second pluralities of set top boxes.

13. The method of claim 12, wherein the set top box characteristic for which the first plurality is selected includes a regional head-end associated with the first plurality of set top boxes.

14. The method of claim 12, wherein correcting for a clock offset comprises:

applying the calculated time offset to the television viewing data associated with the first plurality of set top boxes in order to help synchronize the clocks between the first and second pluralities of set top boxes.

15. The method of claim 14, wherein correcting for a clock offset comprises:

storing the calculated time offset for automatic application to subsequently-received television viewing data from the first plurality of set top boxes.

16. A system for cleaning television viewing data so it can be analyzed with improved accuracy, comprising:

a memory storing computer-executable instructions of a data collection module configured to access television viewing data that has been collected from a plurality of set top boxes, a data cleaning module configured to clean the accessed television viewing data, the data cleaning module comprising:

a buffer overflow detection and correction module configured to correct for buffer overflow within a set top box;

a non-human generated tune detection and correction module configured to correct for non-human generated tunes captured by a set top box; and a clock offset detection and correction module configured to correct for clock offsets between two pluralities of set top boxes, and a data analysis module configured to analyze at least a portion of the television viewing data after it is cleaned by the data cleaning module; and a processor for executing the computer-executable instructions stored in the memory.

\* \* \* \* \*